(12) United States Patent
Li (10) Patent No.: US 11,360,628 B2
(45) Date of Patent: Jun. 14, 2022

(54) SELF-CAPACITIVE TOUCH SUBSTRATE AND DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventor: Yuanhang Li, Hubei (CN)

(73) Assignee: WUHAN CHINA STAR OPTOELECTRONICS SEMICONDUCTOR DISPLAY TECHNOLOGY CO., LTD., Wuhan (CN)

(*) Notice: Subject to any disclaimer, the term of this patent is extended or adjusted under 35 U.S.C. 154(b) by 0 days.

(21) Appl. No.: 17/047,461

(22) PCT Filed: Jul. 20, 2020

(86) PCT No.: PCT/CN2020/103027
§ 371 (c)(1),
(2) Date: Oct. 14, 2020

(87) PCT Pub. No.: WO2021/258455
PCT Pub. Date: Dec. 30, 2021

(65) Prior Publication Data
US 2021/0397304 A1  Dec. 23, 2021

(30) Foreign Application Priority Data
Jun. 23, 2020 (CN) .......................... 202010582014.4

(51) Int. Cl.
*G06F 3/044* (2006.01)

(52) U.S. Cl.
CPC ................................. *G06F 3/0446* (2019.05)

(58) Field of Classification Search
CPC ................... G06F 3/044; G06F 3/0446; G06F 2203/04112
See application file for complete search history.

(56) References Cited

U.S. PATENT DOCUMENTS

| 9,766,764 B2* | 9/2017 | Kim ......................... G06F 3/044 |
| 9,891,735 B2* | 2/2018 | Bae ........................ G06F 3/0443 |
| 10,121,830 B1* | 11/2018 | Li ........................ H01L 27/3246 |
| 10,249,652 B2* | 4/2019 | Li ........................ H01L 27/1262 |

(Continued)

FOREIGN PATENT DOCUMENTS

| CN | 107422903 A | 12/2017 |
| CN | 107608575 A | 1/2018 |

(Continued)

*Primary Examiner* — Amy Onyekaba
(74) *Attorney, Agent, or Firm* — The Roy Gross Law Firm, LLC; Roy Gross (57) ABSTRACT

A self-capacitive touch substrate and a display device are provided. The self-capacitive touch substrate includes a display area, a peripheral area, the plurality of self-capacitive touch electrodes disposed in the display area, and a plurality of touch electrode lead connected to the self-capacitive touch electrodes. The plurality of the self-capacitive touch electrodes are disposed in groups. The self-capacitive touch substrate further includes a thin film transistor switching circuit and a self-capacitive touch electrode lead in the peripheral area.

18 Claims, 10 Drawing Sheets

(56) References Cited

U.S. PATENT DOCUMENTS

| | | | |
|---|---|---|---|
| 10,340,387 B2* | 7/2019 | Li | H01L 21/31116 |
| 10,361,261 B2* | 7/2019 | Bu | H01L 27/3262 |
| 10,394,401 B2* | 8/2019 | Hammura | G06F 3/0445 |
| 10,637,006 B2* | 4/2020 | Ye | H01L 51/56 |
| 10,651,406 B2* | 5/2020 | Li | H01L 27/3244 |
| 10,770,667 B2* | 9/2020 | Li | H05K 3/4691 |
| 10,784,326 B2* | 9/2020 | Cao | H01L 51/5212 |
| 2013/0335367 A1* | 12/2013 | Kim | G06F 3/0446 345/174 |
| 2014/0015770 A1* | 1/2014 | Lee | G06F 3/04166 345/173 |
| 2014/0118009 A1* | 5/2014 | Cheng | G01R 27/2605 430/319 |
| 2014/0232691 A1* | 8/2014 | Lee | G06F 3/0446 345/174 |
| 2014/0293150 A1* | 10/2014 | Tang | G06F 3/0446 349/12 |
| 2014/0307178 A1* | 10/2014 | Tang | G06F 3/0446 349/12 |
| 2014/0327842 A1* | 11/2014 | Tang | G06F 3/04164 156/182 |
| 2015/0205424 A1* | 7/2015 | Park | G06F 3/0446 345/174 |
| 2015/0317012 A1* | 11/2015 | Solven | G06F 3/0443 345/174 |
| 2016/0132153 A1* | 5/2016 | Lin | G06F 3/0446 345/174 |
| 2016/0154499 A1* | 6/2016 | Bae | G06F 3/0446 345/174 |
| 2016/0202833 A1* | 7/2016 | Kim | G06F 3/0443 345/173 |
| 2016/0246412 A1* | 8/2016 | Kim | G06F 3/044 |
| 2016/0274727 A1* | 9/2016 | Nakamura | G06F 3/0448 |
| 2016/0313827 A1* | 10/2016 | Song | G02F 1/134309 |
| 2016/0349558 A1* | 12/2016 | Shishido | G06F 3/0446 |
| 2016/0349901 A1 | 12/2016 | Li et al. | |
| 2016/0357333 A1* | 12/2016 | Huang | G06F 3/0412 |
| 2017/0010493 A1* | 1/2017 | Yu | G06F 3/0443 |
| 2017/0038899 A1* | 2/2017 | Liu | G06F 3/0412 |
| 2017/0038903 A1* | 2/2017 | Sun | G09G 3/36 |
| 2017/0075487 A1* | 3/2017 | Huang | G06F 3/04166 |
| 2017/0083163 A1* | 3/2017 | Liu | G09G 3/3258 |
| 2017/0090663 A1* | 3/2017 | Tang | G06F 3/0445 |
| 2017/0097700 A1* | 4/2017 | Kim | G06F 3/0443 |
| 2017/0160867 A1* | 6/2017 | Zhu | G06F 3/0446 |
| 2017/0168635 A1* | 6/2017 | Xiang | G06F 3/0446 |
| 2017/0177158 A1* | 6/2017 | Tu | G06F 3/0446 |
| 2017/0205956 A1* | 7/2017 | Li | G09G 3/006 |
| 2017/0228074 A1* | 8/2017 | Du | G06F 3/0416 |
| 2017/0242531 A1* | 8/2017 | Soya | G06F 3/04166 |
| 2017/0269762 A1* | 9/2017 | Xu | H01L 27/323 |
| 2017/0357369 A1* | 12/2017 | Liu | G06F 3/0412 |
| 2017/0364187 A1* | 12/2017 | Zhai | G06F 3/0446 |
| 2018/0074629 A1* | 3/2018 | Lee | G02F 1/1368 |
| 2018/0095575 A1* | 4/2018 | Ota | G09G 3/3614 |
| 2018/0095576 A1* | 4/2018 | Yokoo | G06F 3/04166 |
| 2018/0113345 A1* | 4/2018 | Song | G02F 1/134363 |
| 2018/0239457 A1* | 8/2018 | He | G06F 3/0443 |
| 2018/0300007 A1* | 10/2018 | Xu | G06F 3/0412 |
| 2019/0004640 A1* | 1/2019 | Ye | G06F 3/0412 |
| 2019/0012518 A1* | 1/2019 | Yang | G06F 3/0416 |
| 2019/0042019 A1* | 2/2019 | Ding | G09G 3/3208 |
| 2019/0051707 A1* | 2/2019 | Li | G06F 3/0443 |
| 2019/0179461 A1* | 6/2019 | Baek | G06F 3/0412 |
| 2019/0179467 A1* | 6/2019 | Kim | G09G 3/3266 |
| 2019/0196619 A1* | 6/2019 | Baek | G06F 3/04166 |
| 2019/0348473 A1* | 11/2019 | Xu | G06F 3/0412 |
| 2019/0369833 A1* | 12/2019 | Kubo | G06F 3/0412 |
| 2020/0067000 A1* | 2/2020 | Li | H05K 1/0281 |
| 2020/0125202 A1* | 4/2020 | Li | H01L 51/5237 |
| 2020/0159353 A1* | 5/2020 | Xie | G06F 3/0448 |
| 2020/0167026 A1* | 5/2020 | Lee | G06F 3/0414 |
| 2020/0174640 A1* | 6/2020 | Ma | G06F 3/0443 |
| 2021/0096677 A1* | 4/2021 | Zhang | G09G 3/3266 |
| 2021/0097250 A1* | 4/2021 | Tao | G11C 19/28 |
| 2021/0141491 A1* | 5/2021 | Gogte | G06F 3/04164 |

FOREIGN PATENT DOCUMENTS

| | | | |
|---|---|---|---|
| CN | 107918235 A | | 4/2018 |
| CN | 110888553 A | * | 3/2020 |

* cited by examiner

SELF-CAPACITIVE TOUCH SUBSTRATE AND DISPLAY DEVICE

BACKGROUND OF INVENTION

Field of Invention

The present invention relates to the field of display technology, and more particularly, to a self-capacitive touch substrate and a display device.

Description of Prior Art

In recent years, application of capacitive touch screens in electronic products has become increasily popular. Capacitive touch screens work by current induction of the human body. A touch screen senses touch signals by the combination of electrodes and the characteristics of the human body. When a human body like a finger touches the screen, a coupling capacitor may be formed between the finger and the conductive layer of the touch screen due to the electric field of the human body. The current generated by the electrode on the touch screen may flow into the contact point, so that it may accurately determine a location of the touch.

Organic light emitting diode (OLED) on-cell touch display panels, which is called DOT technology, are formed by integrating OLED and touch structure. As compared to the external touch structure, the organic light emitting diode on-cell touch display panels have better transmittance, bending resistance, and thinness, etc., so they will become a future trend of flexible OLED displays.

Currently, the OLED out-cell touch display panels in the market includes a mutual-capacitive electrode, and a total of five layers and four lithography masks from bottom to top are inorganic layer, metal bridge layer, via inorganic layer, touch metal mesh layer, and organic planarization layer. The mutual-capacitive touch structures are formed by etching via holes in the insulating layer of the via inorganic layer to realize the bridging and routing of driving electrode and sensing electrode. The etching depth of the via inorganic layer in the binding area and the operation area are different. The process is complicated.

Figure 1:
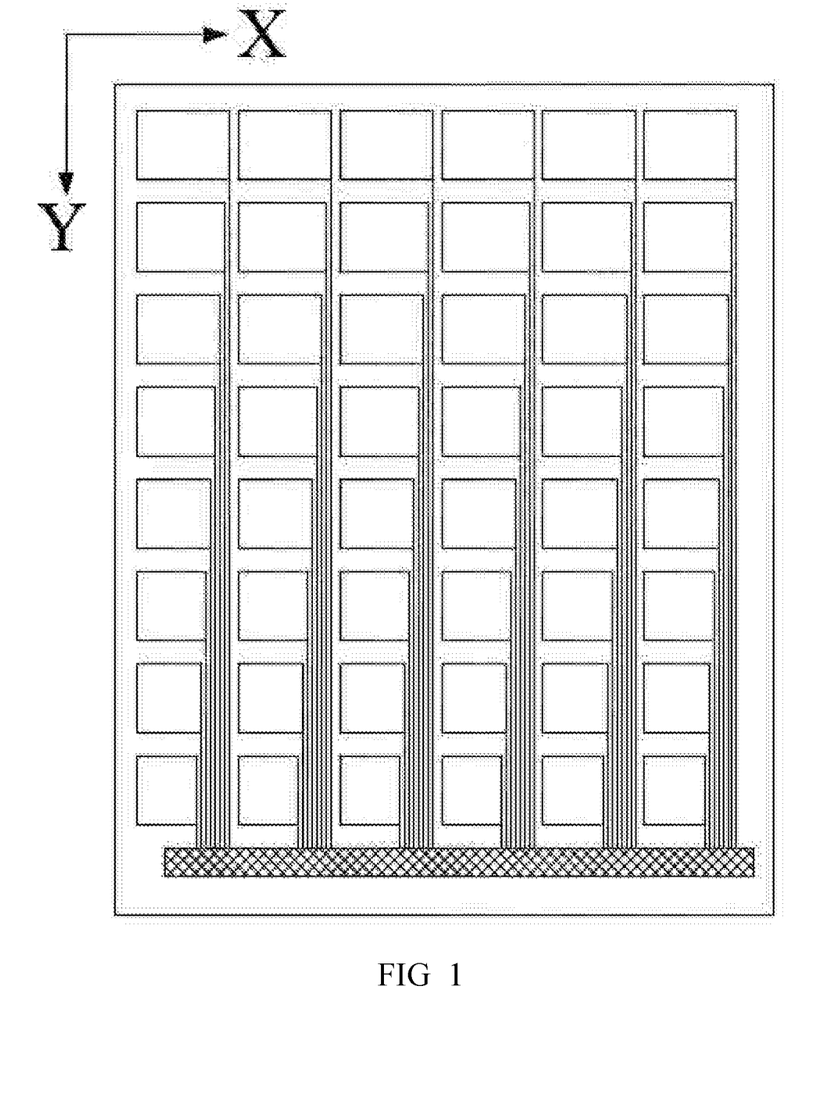
FIG. 1 is a schematic view of a self-capacitive touch substrate in the prior art.

Compared with the mutual-capacitive touch structures, the self-capacitive DOT touch simply has a single-layer metal touch electrode. However, in the self-capacitive touch structure, since each touch electrode needs to lead out by a separate electrode lead, there are many lead channels. FIG. 1 shows a common single-layer self-capacitive touch structure. The touch electrode leads are routing in the visible area. In order to avoid occupying a large visible area, the area of the touch electrode is reduced in order from far end to near end in the flexible printed circuit (FPC) bound to a long terminal Y direction. It optimizes the layout of the touch electrode leads. With the increase in the number of touch electrodes, especially flexible curved screens having larger length and width and more touch electrodes in the long terminal Y direction, the area of the touch electrode will decrease in order from far end to near end. The long terminal Y direction is farther from the FPC binding area, called far end, and the one closer to the FPC binding area is called near end. Therefore, it increases the difference in capacitance between the far end and near end, and affects the touch effect.

SUMMARY OF INVENTION

A self-capacitive touch substrate and a display device are provided to solve technical problems in the prior art. The self-capacitive touch substrate reduces the touch electrode leads and enhances the touch effect by changing the wiring location and the direction in the substrate.

A self-capacitive touch substrate comprises a display area, a peripheral area, a plurality of self-capacitive touch electrodes disposed in the display area, a plurality of touch electrode leads connected to the self-capacitive touch electrodes, a thin film transistor switching circuit disposed in the peripheral area, and a self-capacitive touch electrode lead disposed in the peripheral area. Each of the self-capacitive touch electrodes is connected to one of the touch electrode leads. The plurality of self-capacitive touch electrodes are disposed in a matrix having multiple rows and multiple columns. The plurality of self-capacitive touch electrodes are disposed in groups. The plurality of self-capacitive touch electrodes are connected to the thin film transistor switching circuit in a grouping manner. The thin film transistor switching circuit is a multi-stage thin film transistor switching circuit. The self-capacitive touch substrate comprises a long terminal and a short terminal. The thin film transistor switching circuit comprises a one-stage thin film transistor switching circuit, a two-stage thin film transistor switching circuit, a three-stage thin film transistor switching circuit, or an N-stage thin film transistor switching circuit, and N is a positive integer. The plurality of touch electrode leads comprise a metal grid wiring, a channel width of the metal grid of the metal grid wiring is greater than a width of three grid units, and the metal grid comprises multiple fractures.

In one embodiment, the self-capacitive touch substrate at least comprises a flexible substrate, an array driving circuit, an organic light-emitting layer, a thin-film packaging layer, an interlayer insulating layer, a self-capacitive touch electrode layer, and a planarization layer.

In one embodiment, the self-capacitive touch electrode layer is a single-layer metal mesh structure.

In one embodiment, the plurality of self-capacitive touch electrodes are disposed in two symmetrical areas in a long terminal direction, the plurality of the touch electrode leads corresponding to the two symmetrical areas lead out along a short terminal direction and connected to the thin film transistor switching circuit, and a touch electrode area of the self-capacitive touch electrode decreases sequentially along the short terminal direction.

In one embodiment, the plurality of touch electrode leads corresponding to the two symmetrical areas lead out along the same way of the short terminal direction or the plurality of the touch electrode leads corresponding to the two symmetrical areas lead out along an opposite way of the short terminal direction.

In one embodiment, the plurality of self-capacitive touch electrodes are disposed in two symmetrical areas in a long terminal direction, the plurality of touch electrode leads corresponding to the two symmetrical areas lead out along a short terminal direction and connected to the thin film transistor switching circuit, and a touch electrode area of the self-capacitive touch electrode decreases sequentially along the short terminal direction.

In one embodiment, the plurality of touch electrode leads corresponding to the two symmetrical areas lead out along an opposite way of the short terminal direction.

A self-capacitive touch substrate comprises a display area, a peripheral area, a plurality of self-capacitive touch electrodes disposed in the display area, a plurality of touch electrode leads connected to the self-capacitive touch electrodes, a thin film transistor switching circuit disposed in the peripheral area, and a self-capacitive touch electrode lead disposed in the peripheral area. Each of the self-capacitive touch electrodes is connected to one of the touch electrode leads. The plurality of self-capacitive touch electrodes are disposed in a matrix having multiple rows and multiple columns. The plurality of self-capacitive touch electrodes are disposed in groups. The plurality of self-capacitive touch electrodes are connected to the thin film transistor switching circuit in a grouping manner. The thin film transistor switching circuit is a multi-stage thin film transistor switching circuit. The self-capacitive touch substrate comprises a long terminal and a short terminal.

In one embodiment, the self-capacitive touch substrate at least comprises a flexible substrate, an array driving circuit, an organic light-emitting layer, a thin-film packaging layer, an interlayer insulating layer, a self-capacitive touch electrode layer, and a planarization layer.

In one embodiment, the self-capacitive touch electrode layer is a single-layer metal mesh structure.

In one embodiment, the plurality of self-capacitive touch electrodes are disposed in two symmetrical areas in a long terminal direction, the plurality of the touch electrode leads corresponding to the two symmetrical areas lead out along a short terminal direction and connected to the thin film transistor switching circuit, and a touch electrode area of the self-capacitive touch electrode decrease sequentially along the short terminal direction.

In one embodiment, the plurality of touch electrode leads corresponding to the two symmetrical areas lead out along the same way of the short terminal direction or the plurality of the touch electrode leads corresponding to the two symmetrical areas lead out along an opposite way of the short terminal direction.

In one embodiment, the plurality of self-capacitive touch electrodes are disposed in two symmetrical areas in a long terminal direction, the plurality of touch electrode leads corresponding to the two symmetrical areas lead out along a short terminal direction and connected to the thin film transistor switching circuit, and a touch electrode area of the self-capacitive touch electrode decreases sequentially along the short terminal direction.

In one embodiment, the plurality of the touch electrode leads corresponding to the two symmetrical areas lead out along an opposite way of the short terminal direction.

In one embodiment, the thin film transistor switching circuit comprises a one-stage thin film transistor switching circuit, a two-stage thin film transistor switching circuit, a three-stage thin film transistor switching circuit, or an N-stage thin film transistor switching circuit, and N is a positive integer.

In one embodiment, the plurality of touch electrode leads comprise a metal grid wiring, a channel width of the metal grid of the metal grid wiring is greater than a width of three grid units, and the metal grid comprises multiple fractures.

A display device comprises a self-capacitive touch substrate. The self-capacitive touch substrate comprises a display area, a peripheral area, a plurality of self-capacitive touch electrodes disposed in the display area, a plurality of touch electrode leads connected to the self-capacitive touch electrodes, a thin film transistor switching circuit disposed in the peripheral area, and a self-capacitive touch electrode lead disposed in the peripheral area. Each of the self-capacitive touch electrodes is connected to one of the touch electrode leads. The plurality of self-capacitive touch electrodes are disposed in a matrix having multiple rows and multiple columns. The plurality of self-capacitive touch electrodes are disposed in groups. The plurality of self-capacitive touch electrodes are connected to the thin film transistor switching circuit in a grouping manner. The thin film transistor switching circuit is a multi-stage thin film transistor switching circuit. The self-capacitive touch substrate comprises a long terminal and a short terminal.

In one embodiment, the plurality of self-capacitive touch electrodes are disposed in two symmetrical areas in a long terminal direction, the plurality of the touch electrode leads corresponding to the two symmetrical areas lead out along a short terminal direction and connected to the thin film transistor switching circuit, and a touch electrode area of the self-capacitive touch electrode decrease sequentially along the short terminal direction. The plurality of touch electrode leads corresponding to the two symmetrical areas lead out along the same way of the short terminal direction or the plurality of the touch electrode leads corresponding to the two symmetrical areas lead out along an opposite way of the short terminal direction.

In one embodiment, the plurality of self-capacitive touch electrodes are disposed in two symmetrical areas in a long terminal direction, the plurality of touch electrode leads corresponding to the two symmetrical areas lead out along a short terminal direction and connected to the thin film transistor switching circuit, and a touch electrode area of the self-capacitive touch electrode decreases sequentially along the short terminal direction. The plurality of the touch electrode leads corresponding to the two symmetrical areas lead out along an opposite way of the short terminal direction.

The present invention provides a self-capacitive touch substrate and a display device. A new self-capacitive DOT structure wire line is disposed by changing the location and the direction of the electrode wiring in plane, and a thin film transistor switching circuit is disposed to reduce touch electrode leads. Meanwhile, it achieves a balance of the capacitance effect at the far end and the near end of the self-capacitive DOT and a narrow frame of panel. When the touch electrode leads are routing in the visible area, the wiring is a metal grid. It is a way to ensure the impedance and bending resistance of the touch electrode leads improve the resistance and anti-bending of the self-capacitive DOT structure metal signal wiring, and improve the lifetime of the flexible OLED screen and user experience.

BRIEF DESCRIPTION OF DRAWINGS

In order to more clearly illustrate the technical solutions in the embodiments of the present invention, the drawings used in the description of the embodiments will be briefly described below. It is obvious that the drawings in the following description are only some embodiments of the present invention. Other drawings can also be obtained from those skilled persons in the art based on these drawings without paying any creative effort.

DETAILED DESCRIPTION OF PREFERRED EMBODIMENTS

In order to more clearly illustrate the technical solutions in the embodiments of the present invention, the drawings used in the description of the embodiments will be briefly described below, and apparently the embodiments to be described below are only a part but not all of the embodiments of the disclosure. All other embodiments obtained by a person of ordinary skill in the art based on the embodiments of the present invention without creative efforts shall fall within the protection scope of the present invention. In the description of the present invention, it should be understood that the terms including "center," "longitudinal," "lateral," "length," "width," "thickness," "upper," "lower," "forward," "backward," "left," "right," "vertical," "horizontal," "top," "bottom," "inside," "clockwise," and "counterclockwise" are based on the orientation or positional relationship shown in the drawings, and the terms are merely for convenience of description of the present invention and simplified description, and do not indicate or imply the indicated device or the components must have a specific orientation, specific orientation structure, and operation, and thus they are not to be construed as limiting. Moreover, the terms "first" and "second" are only used for describing purposes and are not to be understood as indicating or implying a relative importance or indicating the number of technical features. Thus, features defining "first" and "second" may include one or more of the features either explicitly or implicitly. In the description of the present invention, "a plurality" means two or more unless otherwise stated. In the description of the present invention, it should be noted that the terms "installation," "link," and "connection" are to be understood broadly unless otherwise specifically defined. For example, it may be a fixed connection, a detachable connection, or an integral connection; it may be a mechanical connection or an electrical connection; it may be direct connection or indirectly connected through an intermediate medium, and It may be the internal connection between two components. The specific meanings of the above terms in the present invention can be understood in the specific circumstances for those skilled persons in the art.

In the description of the present invention, unless otherwise specifically defined, the terms "upper," and "lower" may include the first and second features in direct contact, or may include the first and second features not in direct contact but through other features in between. The term "upper" includes the first feature is right above and obliquely above the second feature, or it simply means that the first feature is higher in level than the second feature. The term "lower" includes the first feature is right below and obliquely below the second feature, or it simply means that the first feature is lower in level than the second feature.

The following disclosure provides many different embodiments or examples for realizing different structures of the present invention. To simplify the disclosure of the present invention, components and settings of specific examples are described as below. These are only examples and are not intended to limit the invention. The present invention may repeat reference numbers and/or reference letters in different examples, and this repetition is for the purpose of simplification and clarity, and does not indicate the relationship between various embodiments and/or settings. The present invention provides examples of various specific processes and materials, but those skilled persons in the art may be aware of the application of other processes and/or the other materials.

Since the length of the flexible curved screen in the Y direction is much longer than in the X direction, the self-capacitive touch electrode requires a large number of metal leads to be driven, the number of touch electrodes along the long terminal Y direction is much larger than the short terminal X direction. The area of the touch electrode decreases from the far end to the near end and cause increase of the difference in capacitance between the far and near ends. It will affect the touch effect.

In one embodiment, the self-capacitive touch substrate comprises a display area, a peripheral area, a plurality of self-capacitive touch electrodes disposed in the display area, and a plurality of touch electrode lead are connected to the self-capacitive touch electrodes. Each of the self-capacitive touch electrodes is connected to one of the touch electrode lead, the plurality of self-capacitive touch electrodes is disposed in a matrix having multiple rows and multiple columns, and the plurality of the self-capacitive touch electrodes are disposed in groups. The self-capacitive touch substrate comprises a thin film transistor switching circuit and a self-capacitive touch electrode lead disposed in the peripheral area.

The plurality of the self-capacitive touch electrodes are connected to the thin film transistor switching circuit in a grouping manner, the thin film transistor switching circuit is a multi-stage thin film transistor switching circuit, the self-capacitive touch substrate comprises a long terminal Y direction and a short terminal X direction. The length of the self-capacitive touch substrate in long terminal Y direction is longer than short terminal X direction.

Figure 2:
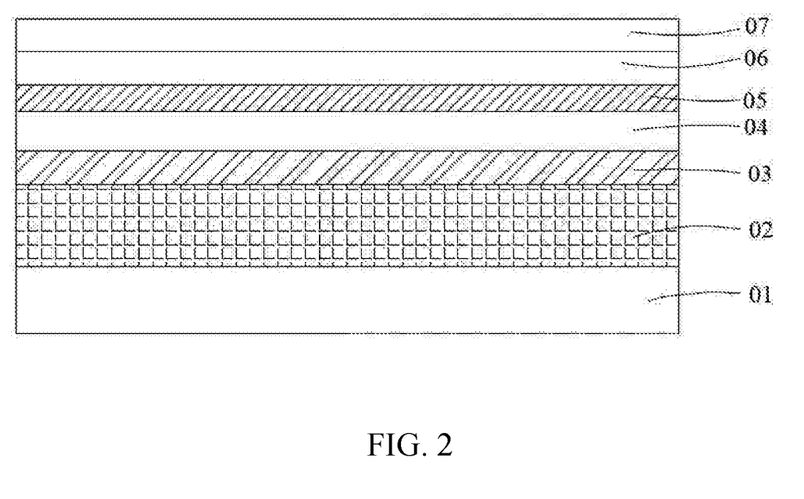
FIG. 2 is a schematic view of a structure layer of the self-capacitive touch substrate according to one embodiment of the present invention.

As shown in FIG. 2, it is a schematic view of a structure layer of the self-capacitive touch substrate according to one embodiment of the present invention. The self-capacitive touch substrate includes: a flexible substrate 01, an array driving circuit 02, an organic light-emitting layer 03, a thin film package layer 04, an interlayer insulating layer 05, a self-capacitive touch electrode layer 06 and a planarization layer 07. The flexible substrate 01 is a polyimide film substrate; any circuit of a low temperature poly-silicon (LTPS), thin film transistor (TFT), indium gallium zinc oxide (IGZO), and low-temperature polycrystalline oxide (LTPO) is the array driving circuit 02; the interlayer insulating layer 05 is a transparent organic layer or a transparent inorganic layer, the interlayer insulating layer 05 made of SINx, SiOx, high-transmitted organic photoresist material. The self-capacitive touch electrode layer 06 is a single-layer metal mesh structure, and the metal material of the self-capacitive touch electrode layer 06 is made of TiAlTi, Mo, Cu, AgNW, ITO, or other low-impedance conductive material.

Figure 3:
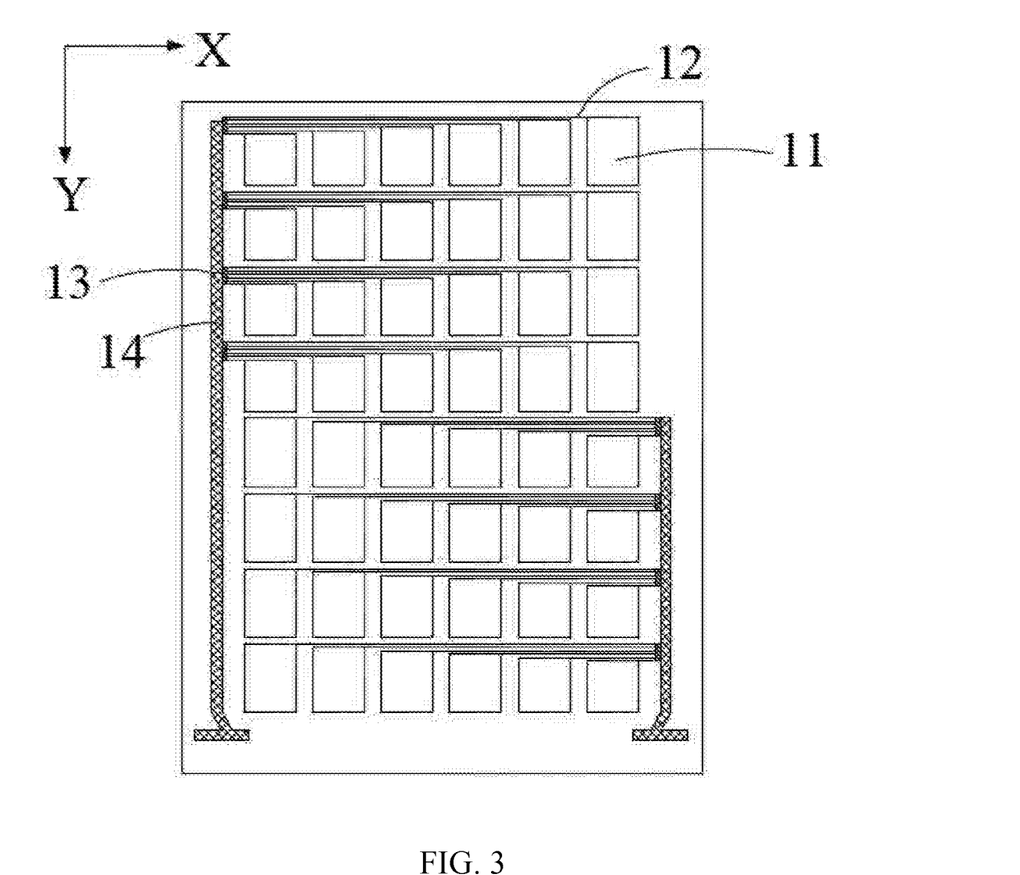
FIG. 3 is a schematic view of a self-capacitive touch substrate according to one embodiment of the present invention.

As shown in FIG. 3, it is a schematic view of the self-capacitive touch substrate according to one embodiment of the present invention. The plurality of self-capacitive touch electrodes 11 at the long terminal Y direction are disposed two symmetrical region, the plurality of the touch electrode leads 12 corresponding to the two symmetrical areas lead out along the short terminal X direction and connected to the thin film transistor switching circuit 13, and the touch electrode area of the self-capacitive touch electrode 11 decrease sequentially along the short terminal X direction. The plurality of the touch electrode leads corresponding to the two symmetrical areas lead out along the opposite way of the short terminal X direction.

As shown in FIG. 3, the plurality of touch electrode leads 12 corresponding to the two symmetrical region lead out along the opposite way of the short terminal X direction, the number of the touch electrode lead 12 are reduced by exchanging the wire connected left and right end, located at the array layer of the thin film transistor switching circuit 13. The thin-film transistor switch circuit 13 connected to the flexible circuit board (FPC) by the touch electrode peripheral leads 14. The thin film transistor switching circuit 13 is a one-stage thin-film transistor switch circuit or a two-stage thin film transistor switching circuit or a three-stage thin film transistor switching circuit or a N-stage thin film transistor switching circuit, and N is a positive integer. In one embodiment, the two-stage thin film transistor switching circuit is provided to reduce the number of touch electrode leads at the flexible printed circuit (FPC) to a quarter of the original number of touch electrode leads. The length and the occupied visible area of the touch electrode lead are shortened by using the touch electrode lead 12 along the short terminal X direction in plane, and thus the difference of the touch electrode area at the far end and the near end is reduced, and the difference of the touch electrode capacitance at the far end and the near end is balanced.

Figure 4:
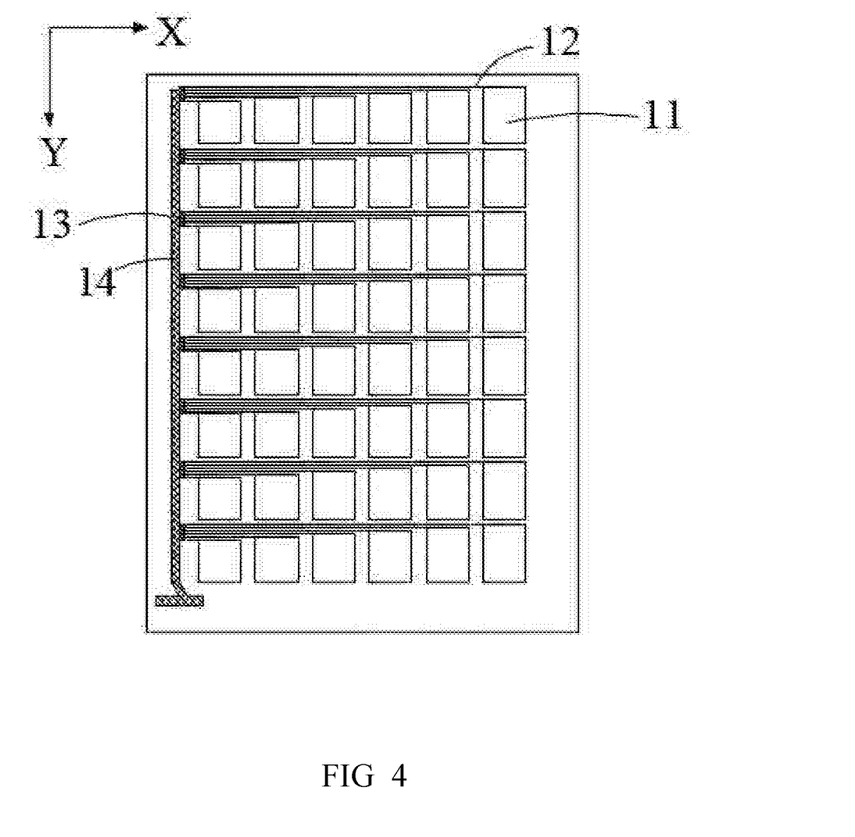
FIG. 4 is a schematic view of another self-capacitive touch substrate according to one embodiment of the present invention.

The plurality of the touch electrode leads 12 corresponding to the two symmetrical areas lead out along the same way of the short terminal X direction. The same way is from left to right or right to left direction, as shown in 4, the embodiment takes the direction from right to left as an example. The plurality of the touch electrode leads 12 corresponding to the two symmetrical areas lead out along the same way of the short terminal X direction. The number of the touch electrode lead 12 are reduced by exchanging the wire connected left and right end, located at array layer of the thin film transistor switching circuit 13. The thin film transistor switching circuit 13 connected to the flexible circuit board (FPC) by the touch electrode peripheral leads 14. The thin film transistor switching circuit 13 is a one-stage thin-film transistor switch circuit or a two-stage thin film transistor switching circuit or a three-stage thin film transistor switching circuit or a N-stage thin film transistor switching circuit, and N is a positive integer. In one embodiment, the two-stage thin film transistor switching circuit is used to reduce the number of touch electrode leads at the flexible printed circuit (FPC) to a quarter of the original number of touch electrode leads. The length and the occupied visible area of the touch electrode lead are shortened by using the touch electrode lead 12 along the short terminal X direction in plane, and thus the difference of the touch electrode area at the far end and the near end is reduced, and the difference of the touch electrode capacitance at the far end and the near end is balanced.

Figure 5:
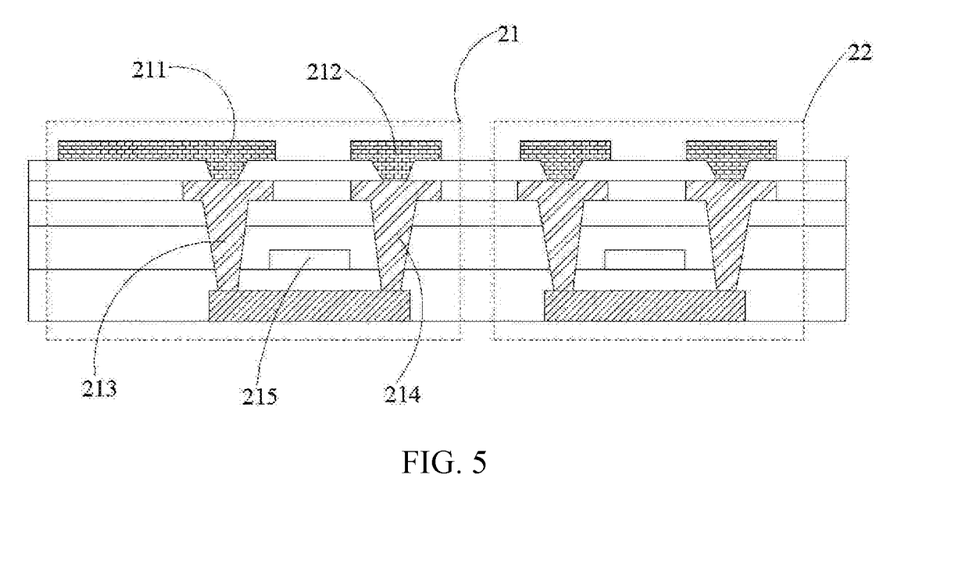
FIG. 5 is a schematic cross-sectional structure view of a thin film transistor switching circuit according to one embodiment of the present invention.

As shown in FIG. 5, it is a schematic cross-sectional structure view of the thin film transistor switching circuit in FIG. 3. The thin film transistor switching circuit in one embodiment is a two-stage thin film transistor switching circuit. The two-stage thin film transistor switching circuit includes a first thin film transistor 21 and the second thin film transistor 22. The first thin film transistor 21 includes a touch electrode lead 211, a FPC terminal touch electrode lead 212, a source of array substrate 213, a drain 214, and a gate 215. The touch electrode lead 211 and the FPC terminal touch electrode lead 212 connect to the source and the drain 214 of the array substrate 213 by via hole. The second thin film transistor 22 structure and the first thin film transistor structure 21 are the same. Switch the touch electrode lead 211 and the FPC terminal touch electrode lead 212 on and off is through the first thin film transistor 21. Adjacent two touch electrode leads corresponding one of the thin film transistor switch constitute a data selecting circuit. Transmits an adjacent clock signal sequentially to two thin film transistor switch by the gate 215 circuit at high speed driving. Switch the first thin film transistor 21 and the second thin film transistor 22 on are timing-adjacent. A data selection command follows the first thin film transistor 21 turns on and then the second thin film transistor 22 turns off. The completion of the data selection command can reduce the number of electrode leads in half. In one embodiment, a two-stage TFT selecting switch circuit is provided. The two-stage TFT selecting switch circuit can reduce the number of electrode leads to a quarter to complete the high-speed scanning and driving of touch electrodes.

Figure 6:
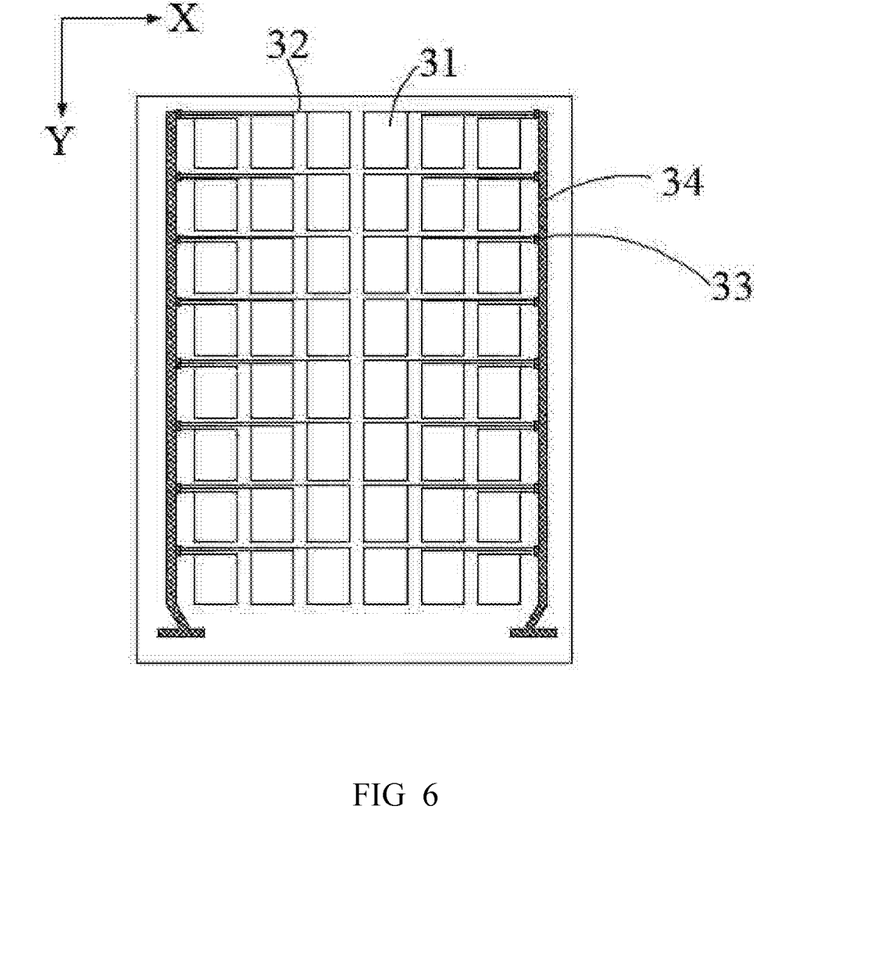
FIG. 6 is a schematic view of yet another self-capacitive touch substrate according to one embodiment of the present invention.

As shown in FIG. 6, it is a schematic view of another self-capacitive touch substrate in one embodiment. The plurality of the touch electrode leads 31 is disposed on the two symmetrical areas at short terminal X direction. The plurality of the touch electrode leads 32 corresponding to the two symmetrical areas lead out along the short terminal X direction and connect to the thin film transistor switching circuit 33, and the touch electrode area of the self-capacitive touch electrode 31 decrease sequentially along the short terminal X direction. The plurality of the touch electrode leads 32 corresponding to the two symmetrical areas lead out along the opposite way of the short terminal X direction.

As shown in FIG. 6, the plurality of the self-capacitive touch electrode leads 31 corresponding to the two symmetrical areas lead out along the same short terminal X direction, the plurality of the touch electrode leads 32 are lead from left and right, the number of the touch electrode lead 32 are reduced by exchanging the wire connected left and right end, located at array layer of the thin film transistor switching circuit 33. The thin-film transistor switch circuit 33 connects to the flexible circuit board by the touch electrode peripheral leads 34. The thin film transistor switching circuit 33 is a one-stage thin-film transistor switch circuit or a two-stage thin film transistor switching circuit or a three-stage thin film transistor switching circuit or a N-stage thin film transistor switching circuit, and N is a positive integer. In one embodiment, a two-stage thin film transistor switching circuit is provided to reduce the number of touch electrode leads at the flexible printed circuit to a quarter of the original number of touch electrode leads. The length and the occupied visible area of the touch electrode lead 32 are shortened by using the touch electrode lead 32 along the short terminal X direction in plane, and thus the difference of the touch electrode area at the far end and the near end is reduced, and the difference of the touch electrode capacitance at the far end and the near end is balanced, and the touch precision is improved.

Figure 7:
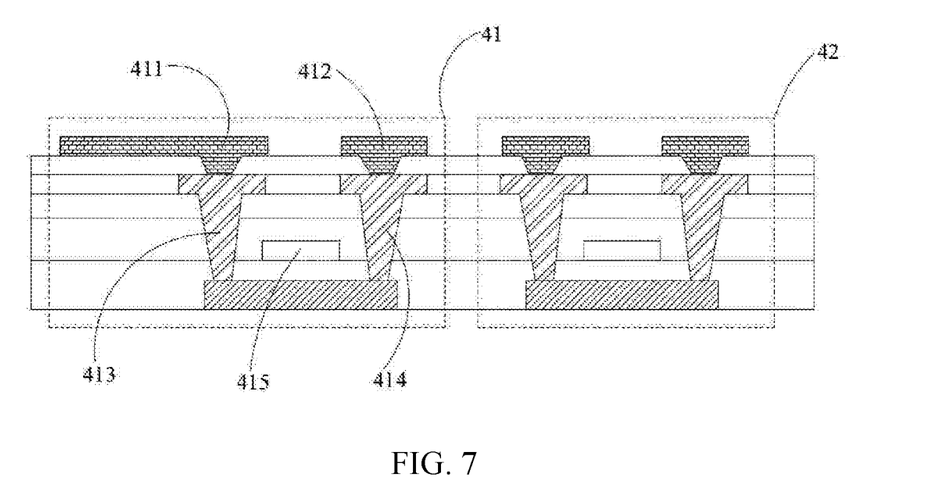
FIG. 7 is a schematic cross-sectional structure view of another thin film transistor switching circuit according to one embodiment of the present invention.

As shown in FIG. 7, it is a schematic cross-sectional structure view of the thin film transistor switching circuit in FIG. 6. The thin film transistor switching circuit in one embodiment is a two-stage thin film transistor switching circuit. The two-stage thin film transistor switching circuit includes a first thin film transistor 41 and the second thin film transistor 42. The first thin film transistor 41 includes a touch electrode lead 411, a FPC terminal touch electrode lead 412, a source of array substrate 413, a drain 414, and a gate 415. The touch electrode lead 411 and the FPC terminal touch electrode lead 412 connect to the source and the drain 414 of the array substrate 413 by via hole. The second thin film transistor 42 structure and the first thin film transistor structure 41 are the same. Switch the touch electrode lead 411 and the FPC terminal touch electrode lead 412 on and off is through the first thin film transistor 41. Adjacent two touch electrode leads corresponding one of the thin film transistor switch constitute a data selecting circuit. Transmits an adjacent clock signal sequentially to two thin film transistor switch by the gate 415 circuit at high speed driving. Switch the first thin film transistor 41 and the second thin film transistor 42 on are timing-adjacent. A data selection command follows the first thin film transistor 41 turns on and then the second thin film transistor 42 turns off. The completion of the data selection command can reduce the number of electrode leads in half. In one embodiment, a two-stage TFT selecting switch circuit is provided. The two-stage TFT selecting switch circuit can reduce the number of electrode leads to a quarter to complete the high-speed scanning and driving of touch electrodes.

Figure 8:
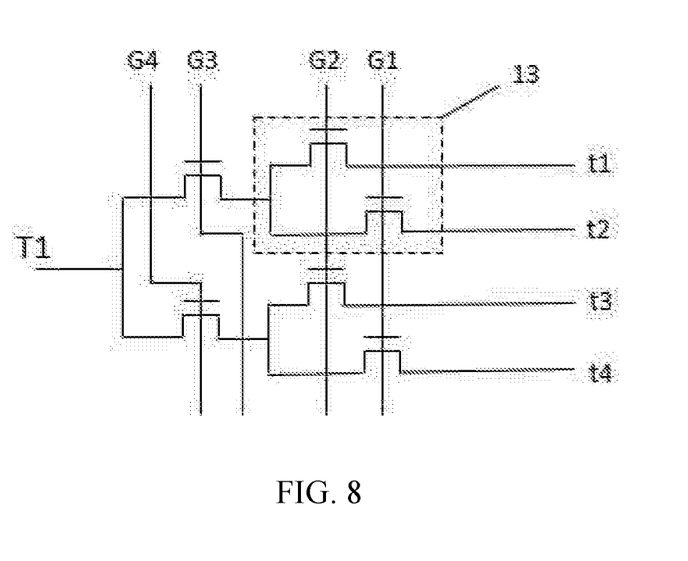
FIG. 8 is a schematic view of a two-stage TFT selecting switch circuit according to one embodiment of the present invention.
Figure 9:
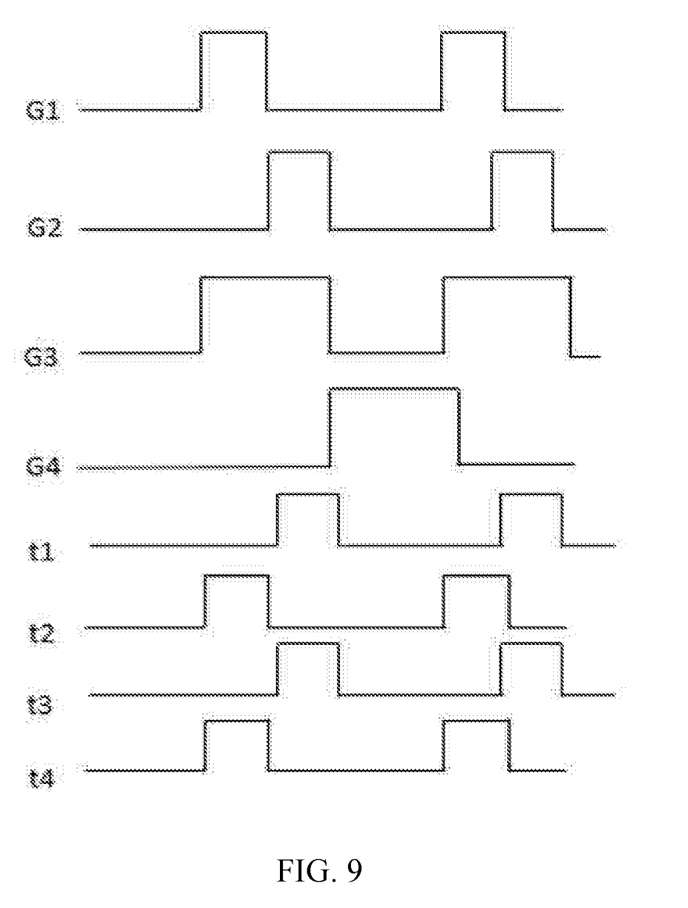
FIG. 9 is a signal-timing diagram of a two-stage TFT selecting switch circuit according to one embodiment of the present invention.

FIG. 8 is a schematic view of a two-stage TFT selecting switch circuit. FIG. 9 is a signal-timing diagram of the two-stage TFT selecting switch circuit. Referring to FIG. 8 and FIG. 9, a one-stage TFT selecting switch 13, the touch electrode lead t1 and t2 corresponding TFT switch are driven by gate signals G2 and G1, the gate signal drives two TFT on and the timing of the switch is adjacent. t1 is on and t2 is off at the same time to complete one data selection command, which can reduce ½ electrode leads. The present invention is a two-stage TFT selecting switch circuit, which can reduce the number of electrode leads to ¼ to complete the high-speed scanning and driving of touch electrodes. Meanwhile, multiplexing the gate signals of the same switching sequence of the adjacent one-stage TFT selecting switch circuit to reduce the gate line and signal arrangement. As in the one-stage TFT selecting switch, G1 simultaneously drive t2 and t4, G2 simultaneously drive t1 and t3. As in the two-stage TFT selecting switch, G3 and G4 also simultaneously drive other TFT switch except for T1.

Figure 10:
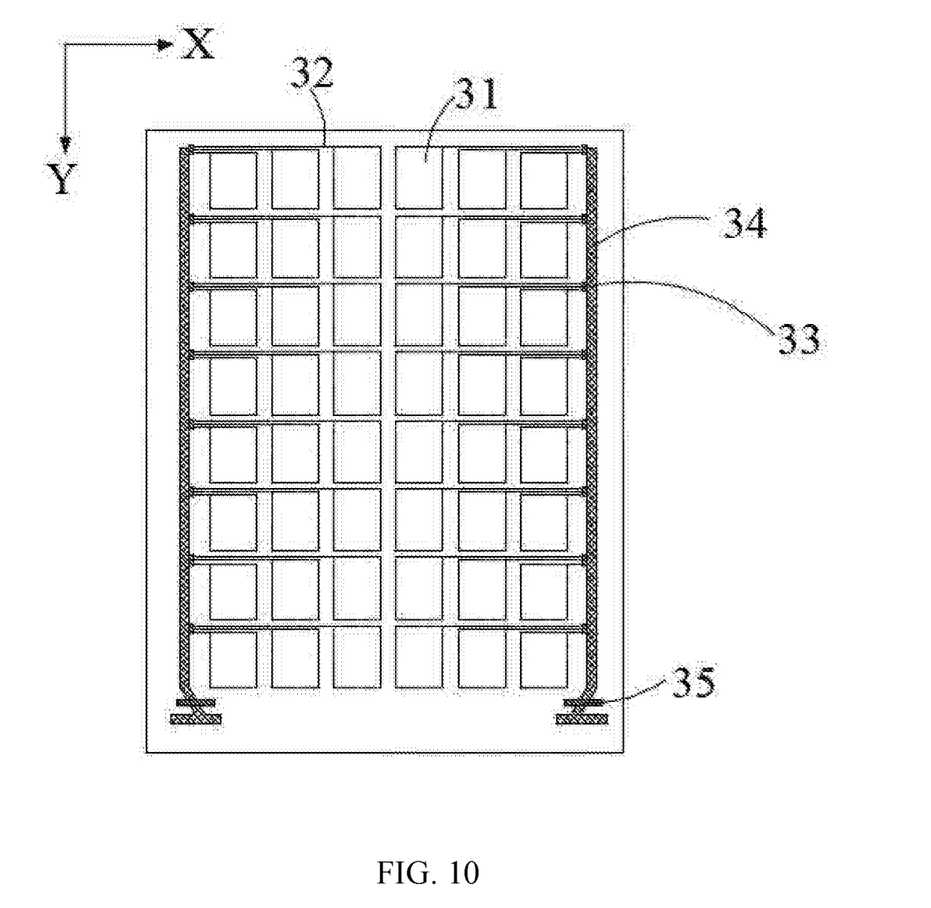
FIG. 10 is a schematic view of a touch substrate structure of a three-stage TFT selecting switch circuit according to one embodiment of the present invention.

The gate driven signal of the TFT selecting switch can be provided by a display IC or a touch IC. Within the range of the touch IC capability, a three-stage or a more stage of TFT selecting circuit can be used, it can greatly reduce the arrangement of the touch electrode leads. In on embodiment, it also belongs the scope of protection, the three-stage TFT or the four-stage TFT selecting circuit may be disposed in the frame at the lower left, and the thin film transistor selecting circuit 35 is shown in FIG. 10.

Figure 11:
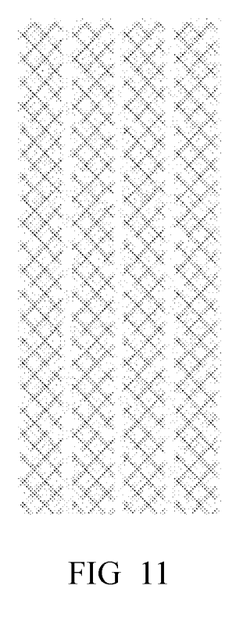
FIG. 11 is a schematic view of a single-layer metal mesh structure of self-capacitive touch electrode layer according to one embodiment of the present invention.

As shown in FIG. 11, it is a schematic view of a single-layer metal mesh structure of the self-capacitive touch electrode layer. When the plurality of the touch electrode leads are routing in the visible area, the route is disposed in the form of the metal grid, and the width of the metal grid channel is greater than three grid units, and the multiple fractures are disposed based on the optical uniformity to form optical compensation. Meanwhile, it is ensured that there are more than two node channels in each metal mesh lead on the cross-section perpendicular to the lead wire direction to reduce the impedance of the touch electrode lead and improve the bending resistance.

The plurality of self-capacitance touch electrodes 11 at the long terminal Y direction or the short terminal X direction is disposed asymmetrically, and the plurality of self-capacitance touch electrodes corresponding to the asymmetric area connects to the thin film transistor switching circuit.

In one embodiment, the display device and the self-capacitive touch substrate are provided.

The self-capacitive touch substrate and the display device are provided in the present invention. A new self-capacitive DOT structure wire line is disposed by changing the location and the direction of the electrode wiring in plane, and the thin film transistor switching circuit is disposed to reduce touch electrode leads. Meanwhile, one embodiment is to realize the balance of the capacitance effect at the far end and the near end of the self-capacitive DOT and the narrow frame of panel. When the touch electrode leads are routing in the visible area, the wiring is a metal grid. It is a way to ensure the impedance and bending resistance of the touch electrode leads, improve the resistance and anti-bending of the self-capacitive DOT structure metal signal wiring and improve the lifetime of the flexible OLED screen and user experience.

In one embodiment, the self-capacitive touch substrate and the display device are provided. The principle and embodiment are detail described to understand the technical solution and core thoughts in present invention. As those skilled in the art will realize, the described embodiments may be modified in various different ways or may be replaced only part of technical characteristics, all without departing from the spirit or scope of the present invention.

What is claimed is:

1. A self-capacitive touch substrate, comprising:
a display area;
a peripheral area;
a plurality of self-capacitive touch electrodes disposed in the display area;
a plurality of touch electrode leads connected to the self-capacitive touch electrodes;
a thin film transistor switching circuit disposed in the peripheral area; and
a self-capacitive touch electrode lead disposed in the peripheral area;
wherein each of the self-capacitive touch electrodes is connected to one of the touch electrode leads;
wherein the plurality of self-capacitive touch electrodes are disposed in a matrix having multiple rows and multiple columns;
wherein the plurality of self-capacitive touch electrodes are disposed in groups;
wherein the plurality of self-capacitive touch electrodes are connected to the thin film transistor switching circuit in a grouping manner;
wherein the self-capacitive touch substrate comprises a long terminal and a short terminal;
wherein the plurality of touch electrode leads comprise a metal grid wiring, a channel width of the metal grid of the metal grid wiring is greater than a width of three grid units, and the metal grid comprises multiple fractures;
wherein the thin film transistor switching circuit is a two-stage thin film transistor comprising a first thin film transistor and a second thin film transistor, and wherein the first thin film transistor comprises a touch electrode lead, a flexible printed circuit board (FPC)

terminal touch electrode lead, a source and a drain of an array substrate, and a gate, and wherein the touch electrode lead and the FPC terminal touch electrode lead connect to the source and the drain of the array substrate by via hole, and wherein the second thin film transistor structure and the first thin film transistor structure are the same; and wherein adjacent two touch electrode leads corresponding to one of the thin film transistors to constitute a data selecting circuit, and wherein an adjacent clock signal is transmitted to gates of the first thin film transistor and the second thin film transistor to sequentially drive the first thin film transistor and the second thin film transistor at high driving speed.

2. The self-capacitive touch substrate according to claim 1, wherein the self-capacitive touch substrate at least comprises a flexible substrate, an array driving circuit, an organic light-emitting layer, a thin-film packaging layer, an interlayer insulating layer, a self-capacitive touch electrode layer, and a planarization layer.

3. The self-capacitive touch substrate according to claim 2, wherein the self-capacitive touch electrode layer is a single-layer metal mesh structure.

4. The self-capacitive touch substrate according to claim 1, wherein the plurality of self-capacitive touch electrodes are disposed in two symmetrical areas in a long terminal direction, the plurality of the touch electrode leads corresponding to the two symmetrical areas lead out along a short terminal direction and connected to the thin film transistor switching circuit, and a touch electrode area of the self-capacitive touch electrode decreases sequentially along the short terminal direction.

5. The self-capacitive touch substrate according to claim 4, wherein the plurality of touch electrode leads corresponding to the two symmetrical areas lead out along the same way of the short terminal direction or the plurality of the touch electrode leads corresponding to the two symmetrical areas lead out along an opposite way of the short terminal direction.

6. The self-capacitive touch substrate according to claim 1, wherein the plurality of self-capacitive touch electrodes are disposed in two symmetrical areas in a long terminal direction, the plurality of touch electrode leads corresponding to the two symmetrical areas lead out along a short terminal direction and connected to the thin film transistor switching circuit, and a touch electrode area of the self-capacitive touch electrode decreases sequentially along the short terminal direction.

7. The self-capacitive touch substrate according to claim 6, wherein the plurality of touch electrode leads corresponding to the two symmetrical areas lead out along an opposite way of the short terminal direction.

8. A self-capacitive touch substrate, comprising:
a display area;
a peripheral area;
a plurality of self-capacitive touch electrodes disposed in the display area;
a plurality of touch electrode leads connected to the self-capacitive touch electrodes;
a thin film transistor switching circuit disposed in the peripheral area; and
a self-capacitive touch electrode lead disposed in the peripheral area;
wherein each of the self-capacitive touch electrodes is connected to one of the touch electrode leads;

wherein the plurality of self-capacitive touch electrodes are disposed in a matrix having multiple rows and multiple columns;

wherein the plurality of self-capacitive touch electrodes are disposed in groups;

wherein the plurality of self-capacitive touch electrodes are connected to the thin film transistor switching circuit in a grouping manner;

wherein the self-capacitive touch substrate comprises a long terminal and a short terminal;

wherein the thin film transistor switching circuit is a two-stage thin film transistor comprising a first thin film transistor and a second thin film transistor, and wherein the first thin film transistor comprises a touch electrode lead, a flexible printed circuit board (FPC) terminal touch electrode lead, a source and a drain of an array substrate, and a gate, and wherein the touch electrode lead and the FPC terminal touch electrode lead connect to the source and the drain of the array substrate by via hole, and wherein the second thin film transistor structure and the first thin film transistor structure are the same; and wherein adjacent two touch electrode leads corresponding to one of the thin film transistors to constitute a data selecting circuit, and wherein an adjacent clock signal is transmitted to gates of the first thin film transistor and the second thin film transistor to sequentially drive the first thin film transistor and the second thin film transistor at high driving speed.

9. The self-capacitive touch substrate according to claim 8, wherein the self-capacitive touch substrate at least comprises a flexible substrate, an array driving circuit, an organic light-emitting layer, a thin-film packaging layer, an interlayer insulating layer, a self-capacitive touch electrode layer, and a planarization layer.

10. The self-capacitive touch substrate according to claim 9, wherein the self-capacitive touch electrode layer is a single-layer metal mesh structure.

11. The self-capacitive touch substrate according to claim 8, wherein the plurality of self-capacitive touch electrodes are disposed in two symmetrical areas in a long terminal direction, the plurality of the touch electrode leads corresponding to the two symmetrical areas lead out along a short terminal direction and connected to the thin film transistor switching circuit, and a touch electrode area of the self-capacitive touch electrode decrease sequentially along the short terminal direction.

12. The self-capacitive touch substrate according to claim 11, wherein the plurality of touch electrode leads corresponding to the two symmetrical areas lead out along the same way of the short terminal direction or the plurality of the touch electrode leads corresponding to the two symmetrical areas lead out along an opposite way of the short terminal direction.

13. The self-capacitive touch substrate according to claim 8, wherein the plurality of self-capacitive touch electrodes are disposed in two symmetrical areas in a long terminal direction, the plurality of touch electrode leads corresponding to the two symmetrical areas lead out along a short terminal direction and connected to the thin film transistor switching circuit, and a touch electrode area of the self-capacitive touch electrode decreases sequentially along the short terminal direction.

14. The self-capacitive touch substrate according to claim 13, wherein the plurality of the touch electrode leads corresponding to the two symmetrical areas lead out along an opposite way of the short terminal direction.

15. The self-capacitive touch substrate according to claim 8, wherein the plurality of touch electrode leads comprise a metal grid wiring, a channel width of the metal grid of the metal grid wiring is greater than a width of three grid units, and the metal grid comprises multiple fractures.

16. A display device, comprising:
a self-capacitive touch substrate, wherein the self-capacitive touch substrate comprises:
a display area;
a peripheral area;
a plurality of self-capacitive touch electrodes disposed in the display area;
a plurality of touch electrode leads connected to the self-capacitive touch electrodes;
a thin film transistor switching circuit disposed in the peripheral area; and
a self-capacitive touch electrode lead disposed in the peripheral area;
wherein each of the self-capacitive touch electrodes is connected to one of the touch electrode leads;
wherein the plurality of self-capacitive touch electrodes are disposed in a matrix having multiple rows and multiple columns;
wherein the plurality of self-capacitive touch electrodes are disposed in groups;
wherein the plurality of self-capacitive touch electrodes are connected to the thin film transistor switching circuit in a grouping manner
wherein the self-capacitive touch substrate comprises a long terminal and a short terminal;
wherein the thin film transistor switching circuit is a two-stage thin film transistor comprising a first thin film transistor and a second thin film transistor, and wherein the first thin film transistor comprises a touch electrode lead, a flexible printed circuit board (FPC) terminal touch electrode lead, a source and a drain of an array substrate, and a gate, and wherein the touch electrode lead and the FPC terminal touch electrode lead connect to the source and the drain of the array substrate by via hole, and wherein the second thin film transistor structure and the first thin film transistor structure are the same; and
wherein adjacent two touch electrode leads corresponding to one of the thin film transistors to constitute a data selecting circuit, and wherein an adjacent clock signal is transmitted to gates of the first thin film transistor and the second thin film transistor to sequentially drive the first thin film transistor and the second thin film transistor at high driving speed.

17. The display device according to claim 16, wherein the plurality of self-capacitive touch electrodes are disposed in two symmetrical areas in a long terminal direction, the plurality of the touch electrode leads corresponding to the two symmetrical areas lead out along a short terminal direction and connected to the thin film transistor switching circuit, and a touch electrode area of the self-capacitive touch electrode decrease sequentially along the short terminal direction; and
wherein the plurality of touch electrode leads corresponding to the two symmetrical areas lead out along the same way of the short terminal direction or the plurality of the touch electrode leads corresponding to the two symmetrical areas lead out along an opposite way of the short terminal direction.

18. The display device according to claim 16, wherein the plurality of self-capacitive touch electrodes are disposed in two symmetrical areas in a long terminal direction, the plurality of touch electrode leads corresponding to the two symmetrical areas lead out along a short terminal direction and connected to the thin film transistor switching circuit, and a touch electrode area of the self-capacitive touch electrode decreases sequentially along the short terminal direction; and
wherein the plurality of the touch electrode leads corresponding to the two symmetrical areas lead out along an opposite way of the short terminal direction.

* * * * *